United States Patent
Dan

(10) Patent No.: US 8,610,908 B2
(45) Date of Patent: Dec. 17, 2013

(54) GENERATION OF OUTPUT DATA PROCESSABLE BY DATA OUTPUTTING APPARATUS WITHOUT NEEDING APPARATUS INFORMATION IN ADVANCE

(75) Inventor: Koji Dan, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1122 days.

(21) Appl. No.: 12/467,332

(22) Filed: May 18, 2009

(65) Prior Publication Data

US 2009/0313541 A1    Dec. 17, 2009

(30) Foreign Application Priority Data

Jun. 12, 2008   (JP) ................ 2008-154538

(51) Int. Cl.
*G06F 17/00*   (2006.01)

(52) U.S. Cl.
USPC ........... 358/1.13; 358/1.9; 358/1.15; 399/81; 710/10; 710/11; 715/762

(58) Field of Classification Search
USPC ............ 358/1.9, 1.13, 1.15; 710/10, 11; 715/762; 399/81
See application file for complete search history.

(56) References Cited

U.S. PATENT DOCUMENTS

| | | | |
|---|---|---|---|
| 6,369,909 B1 | 4/2002 | Shima | |
| 7,195,408 B2 * | 3/2007 | Nishiguchi | ............. 400/76 |
| 2004/0073632 A1 | 4/2004 | Simpson et al. | |
| 2004/0257610 A1 | 12/2004 | Itoh et al. | |
| 2005/0105126 A1 * | 5/2005 | Kawakami et al. | ......... 358/1.15 |
| 2005/0188084 A1 | 8/2005 | Tokishige et al. | |
| 2006/0203283 A1 * | 9/2006 | Fujimoto | ............. 358/1.15 |
| 2007/0109593 A1 | 5/2007 | Ohta et al. | |
| 2007/0299989 A1 | 12/2007 | Maruyama | |
| 2008/0074686 A1 | 3/2008 | Naito et al. | |

FOREIGN PATENT DOCUMENTS

| | | |
|---|---|---|
| EP | 0 867 800 A2 | 9/1998 |
| EP | 1 308 834 A2 | 5/2003 |
| JP | 2003-023537 | 1/2003 |
| JP | 2004-287496 | 10/2004 |
| JP | 2006-001135 | 1/2006 |
| JP | 2006-252480 | 9/2006 |
| JP | 2007-140588 | 6/2007 |
| JP | 2008-009967 | 1/2008 |

OTHER PUBLICATIONS

Partial European Search Report.
Japanese Office Action dated Mar. 27, 2012.
Extended European Search Report.

* cited by examiner

*Primary Examiner* — Peter K Huntsinger
(74) *Attorney, Agent, or Firm* — IPUSA, PLLC

(57) ABSTRACT

An information processing apparatus includes a data requesting unit configured to request the data outputting apparatus to provide output condition setting screen data for displaying an output condition setting screen, a screen display unit configured to receive the output condition setting screen data sent from the data outputting apparatus and to display the output condition setting screen based on the output condition setting screen data, a setting information storing unit configured to store output condition setting information that is set on the output condition setting screen displayed by the screen display unit, and an output data generating unit configured to generate output data processable by the data outputting apparatus in response to the output condition setting information stored in the storage apparatus.

17 Claims, 15 Drawing Sheets

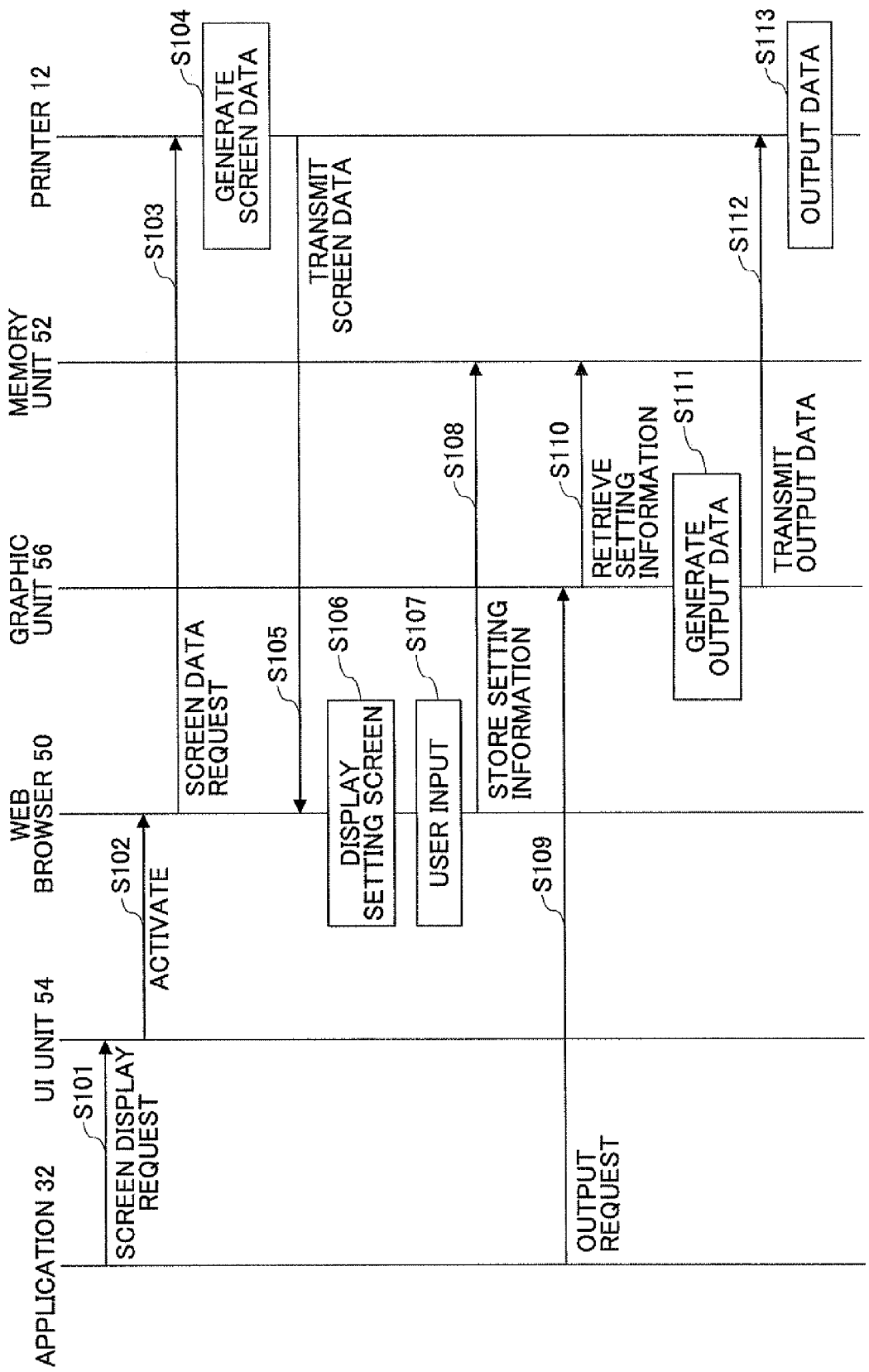

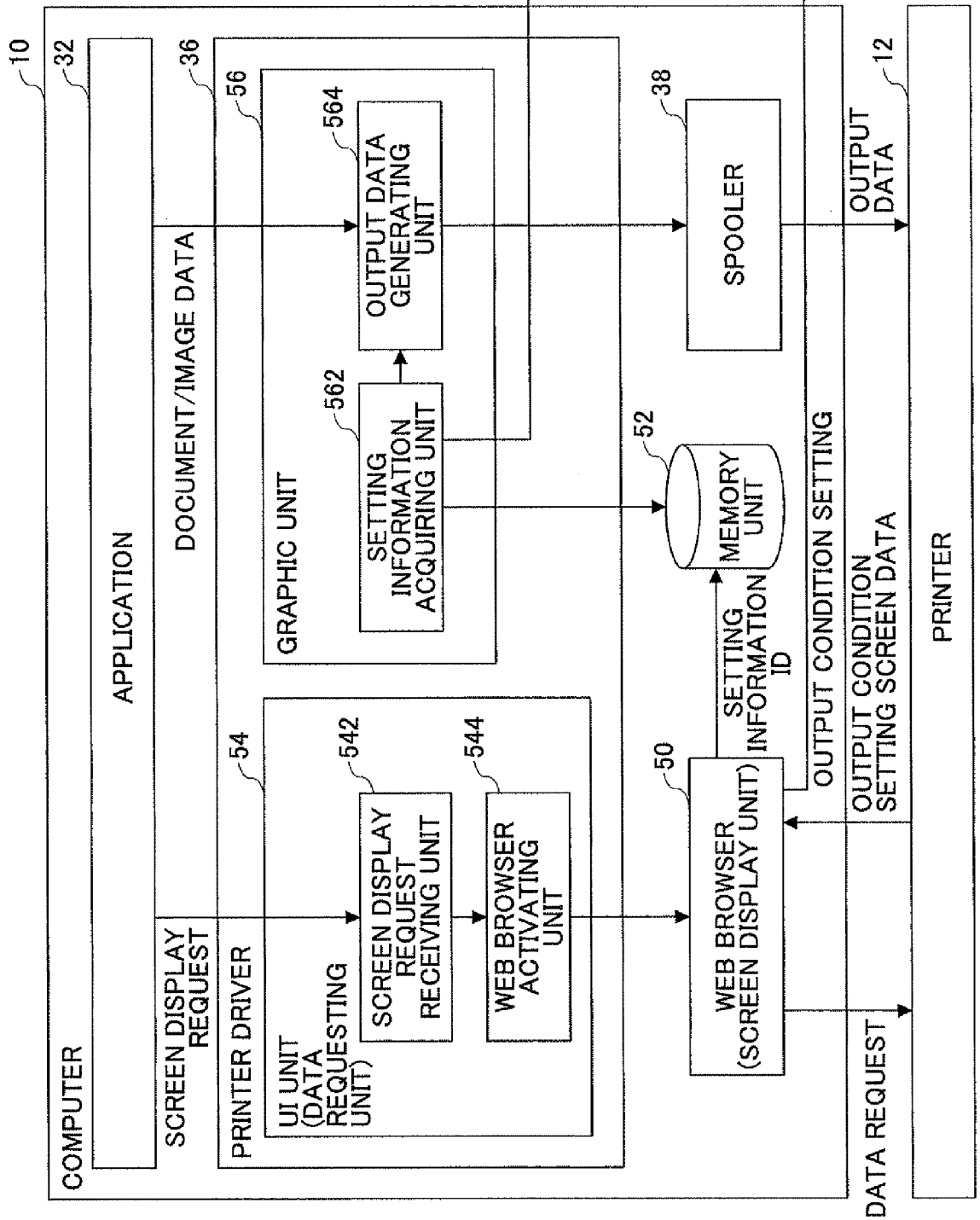

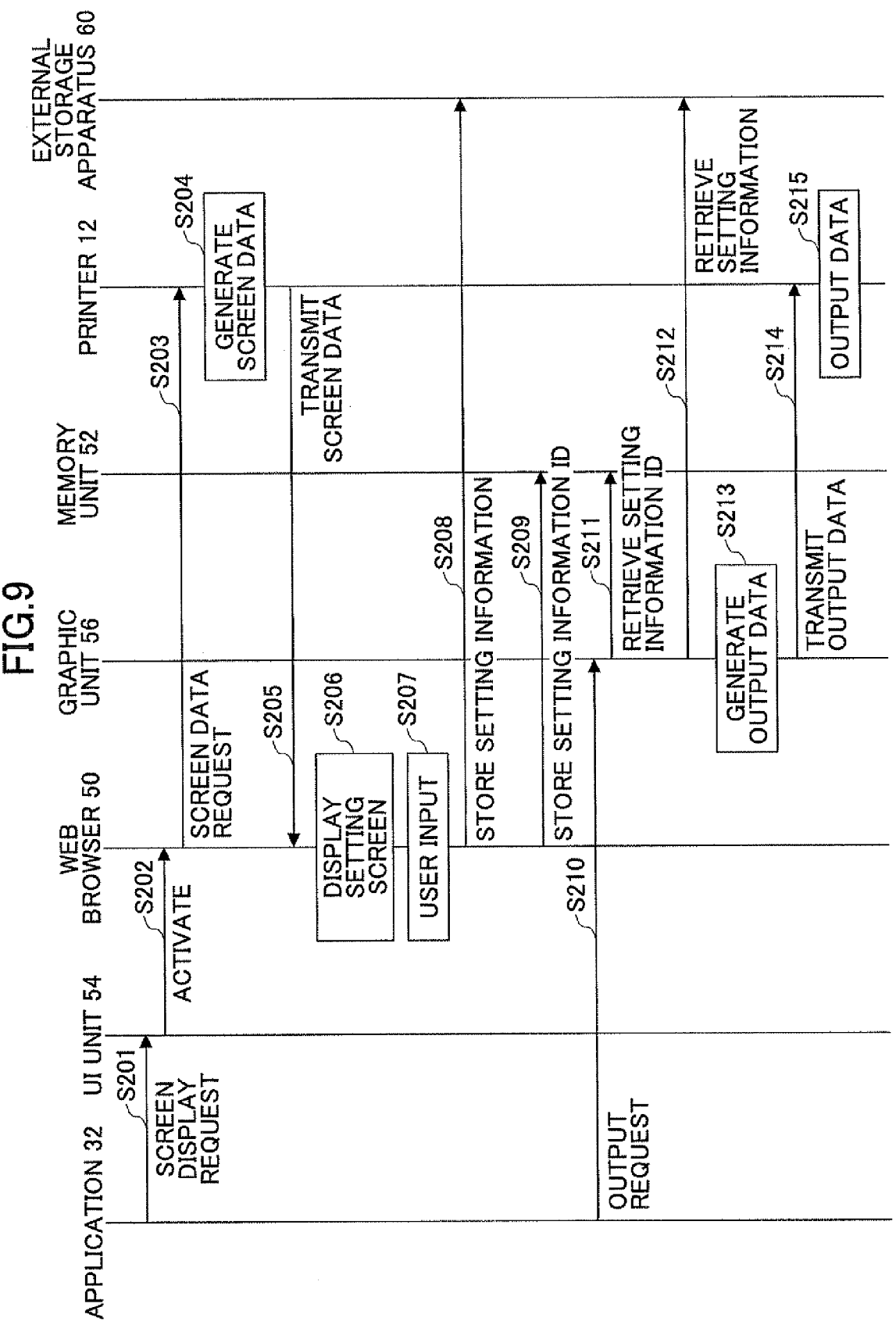

FIG.10

```
<?xml version = "1.0" encoding = "utf-8"?>
<printer job settings>
        <settings id>
                <pc = "hostXX" />
                <app = "MS-Word2000" />
                <doc = "test.doc" />
                <id = 12345678 />
        </settings id>

<feature id = "Media Type">
                <option id = "Plain" />
        </feature>
        <feature id = "Paper Size">
                <option id = "A4" />
        </feature>
        <feature id = "Duplexing">
                <option id = "Off" />
        </feature>
        .....
</printer job settings>
```

- 70
- 72 (settings id block)
- 74a (Media Type)
- 74b (Paper Size)
- 74c (Duplexing)
- 74 (feature block)

FIG.14

```
<?xml version = "1.0" encoding = "utf-8"?>
<Lock Profile>
        <user = "XYZ">
        <Locked Settings>
                <feature id = "Page Size">
                        <option opid = "A5" />
                        <option opid = "A6" />
                </feature>
                <feature id = "Media Type">
                </feature>
        </Locked Settings>
</Lock Profile>
```

FIG.15

```
<?xml version = "1.0" encoding = "utf-8"?>
<Default Profile>           ~92
  <user = "XYZ">
  <Default Settings>
    <default id = "Color" opid = "Mono" />        ~94a
    <default id = "Page Size" opid = "Legal" />   ~94b
    <default id = "Input Tray" opid = "Tray3" />  ~94c
  </Default Settings>
</Default Profile>
```

90

94 { 94a, 94b, 94c }

GENERATION OF OUTPUT DATA PROCESSABLE BY DATA OUTPUTTING APPARATUS WITHOUT NEEDING APPARATUS INFORMATION IN ADVANCE

BACKGROUND OF THE INVENTION

1. Field of the Invention

The disclosures herein generally relate to information processing apparatuses, data outputting systems, and recording media having a data generating program embodied therein, and particularly relate to an information processing apparatus for generating output data in a format processable by a connected data outputting apparatus, a data outputting system including such an information processing apparatus and at least one data outputting apparatus, and a recording medium having a data generating program embodied therein.

2. Description of the Related Art

An information processing apparatus such as a personal computer (hereinafter simply referred to as a PC) may be connected via a network or serial line to a peripheral apparatus such as a printer, a scanner, or a facsimile (FAX) machine. In such a configuration, a PC is provided with a device driver for converting data generated or viewed by application software installed therein into data that is processable by the peripheral apparatus.

In the case of an image forming apparatus such as a laser printer or multifunction printer (hereinafter simply referred to as a printer) being connected as a peripheral apparatus, a PC is generally provided with an embedded printer driver dedicated for this printer. Such a printer driver converts data generated and/or viewed by application software into data written in a page description language (PDL) that is processable by the printer. In order to use a plurality of printers on a network from a single PC, the PC needs to be provided with a plurality of printer drivers embedded therein in one-to-one correspondence to these printers.

An operation performed to embed a device driver in a PC is generally referred to as an installment. Such an installment operation is often restricted for the purpose of network management such that only a specified administrator can perform the installment. Further, the installment procedure is comprised of complicated tasks. When a new printer driver is installed in a business for which printing is an important part of the business, an operation test may be performed prior to the use of the printer driver in the actual business of the business in order to check whether basic print tasks can properly be performed. When a printer driver already installed in a PC needs to be updated for functional extension, a new device driver having new functions may generally be installed. Upon the installment of such a device driver, an administrator generally checks the system environment in which the new device driver is embedded. This check requires a large amount of time and labor. In some cases, it may take three months more or less to perform a check for one installed device driver.

It is thus desirable to provide a single driver that is usable for a plurality of different models. The use of such a driver usable for different models eliminates the need for installment and check operations upon connecting a new peripheral apparatus to a PC. This arrangement is expected to bring about significant cost reduction in terms of check operations.

Japanese Patent Application Publication No. 2008-9967 discloses an information processing apparatus and the like that can generate data processable by various apparatuses regardless of the types of the apparatuses and expanded functions.

In the information processing apparatus disclosed in the above-noted patent publication, however, apparatus information needs to be incorporated as add-in data. Some workload is thus required on the part of a user although not so heavy as the workload associated with driver installment.

Accordingly, it is desirable to provide an information processing apparatus that can generate data processable by apparatuses regardless of the types of the apparatuses and the types of extended functions without needing device information in advance.

SUMMARY OF THE INVENTION

It is a general object of at least one embodiment of the present invention to provide an information processing apparatus that substantially eliminates one or more problems caused by the limitations and disadvantages of the related art.

In one embodiment, an information processing apparatus for generating output data processable by a data outputting apparatus coupled thereto includes: a data requesting unit configured to send a data request to the data outputting apparatus to request the data outputting apparatus to provide output condition setting screen data for displaying an output condition setting screen on which an output condition used in outputting the output data at the data outputting apparatus is to be set; a screen display unit configured to receive the output condition setting screen data sent from the data outputting apparatus responding to the data request from the data requesting unit and to display the output condition setting screen based on the output condition setting screen data; a setting information storing unit configured to store, in a storage apparatus, output condition setting information that is set on the output condition setting screen displayed by the screen display unit; and an output data generating unit configured to generate output data processable by the data outputting apparatus in response to the output condition setting information stored in the storage apparatus.

According to another embodiment, a data outputting system includes the information processing apparatus described above and the data outputting apparatus coupled to the information processing apparatus, wherein the data outputting apparatus includes: a data receiving unit configured to receive output data generated by the information processing apparatus; a data outputting unit configured to output the output data received by the data receiving unit; an information storage unit configured to store specification information indicative of functions performable by the data outputting apparatus and status information indicative of a current status of the data outputting apparatus; and a screen data generating unit configured to respond to the data request sent from the information processing apparatus by generating, based on the specification information and status information stored in the information storage unit, the output condition setting screen data for displaying an output condition setting screen on which an output condition used in outputting the output data at the data outputting apparatus is to be set.

According to another embodiment, a machine-readable recording medium having a program embodied therein for causing a computer to function as an information processing apparatus for generating output data processable by a data outputting apparatus coupled thereto is provided. The program causes the computer to perform: sending a data request to the data outputting apparatus to request the data outputting apparatus to provide output condition setting screen data for displaying an output condition setting screen on which an output condition used in outputting the output data at the data outputting apparatus is to be set; receiving the output condition setting screen data sent from the data outputting apparatus responding to the data request thereby to display the output condition setting screen based on the output condition setting screen data; and generating output data processable by the data outputting apparatus in response to output condition setting information that is set on the displayed output condition setting screen.

BRIEF DESCRIPTION OF THE DRAWINGS

Other objects and further features of embodiments will be apparent from the following detailed description when read in conjunction with the accompanying drawings, in which:

FIG. 7 is a sequence chart illustrating a first example of operations performed upon the issuance of a request to display an output condition setting screen at the computer of FIG. 4 to output data;

FIG. 8 is a block diagram illustrating a second example of the detailed configuration of the computer according to the embodiment;

FIG. 9 is a sequence chart illustrating a second example of operations performed upon the issuance of a request to display an output condition setting screen at the computer of FIG. 8 to output data;

FIG. 10 is a drawing illustrating an example of the data structure of output condition setting information;

FIG. 14 is a drawing illustrating an example of the data structure of user registration data; and FIG. 15 is a drawing illustrating an example of the data structure of default information.

DESCRIPTION OF THE PREFERRED EMBODIMENTS

In the following, embodiments for carrying out the present invention will be described by referring to the accompanying drawings.

Figure 1:
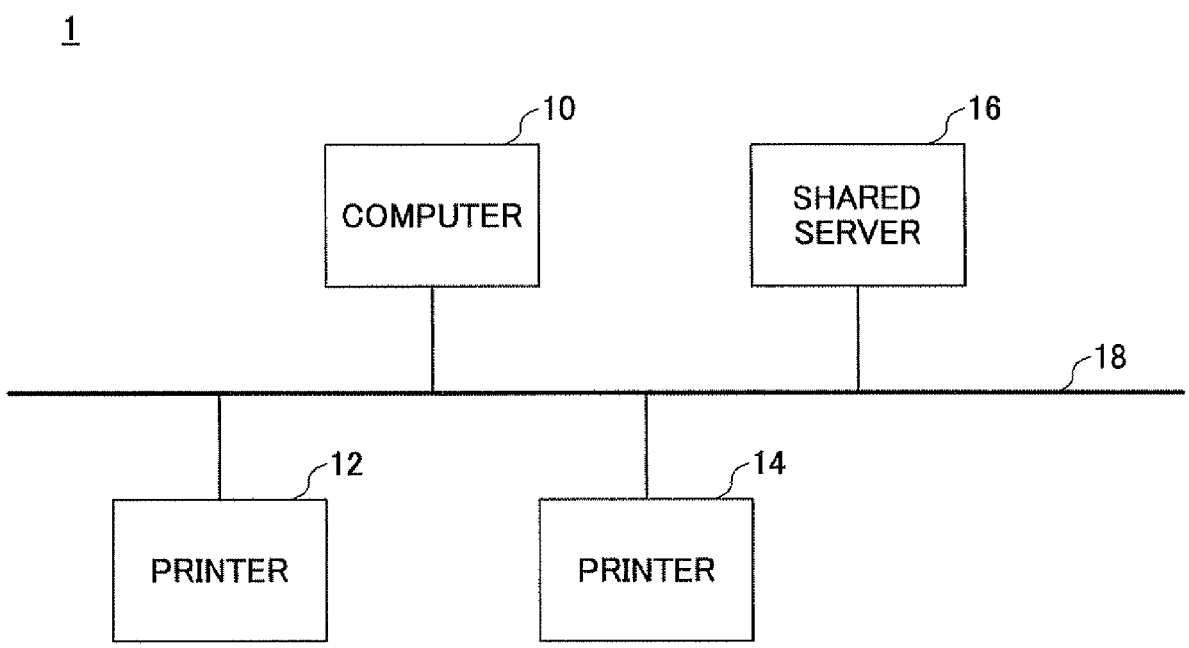
FIG. 1 is a drawing illustrating an example of the network configuration of a data outputting system according to an embodiment of the present invention.

FIG. 1 is a drawing illustrating an example of the network configuration of a data outputting system according to an embodiment of the present invention.

In FIG. 1, a data outputting system 1 includes a computer 10 serving as an information processing apparatus, first and second printers 12 and 14 serving as data outputting apparatuses, a shared server 16, and a network 18 that connects therebetween to enable data communications. Document and/or image data generated or viewed by the computer 10 can be output to the printer 12 or 14.

The computer 10 may be a personal computer (PC), PDA (Personal Digital Assistants), mobile phone, or the like that can display a user interface (UI) based on an operating system (OS).

Each of the first and second printers 12 and 14 is a data outputting apparatus for outputting data generated by the computer 10. In this embodiment, an image forming apparatus such as a laser printer or multifunction printer (hereinafter simply referred to as a printer) is used as an example of such data outputting apparatus.

The shared server 16 is an external storage apparatus shared by the computer 10 and other computers (not shown).

In FIG. 1, only one computer and two printers are illustrated for the purpose of convenience of illustration. More computers and printers may be provided in an actual system. Connections between the computer and the printers may be a network such as a LAN (Local Area Network) or the Internet as illustrated in FIG. 1, or may be a serial line such as a USB.

Figure 2:
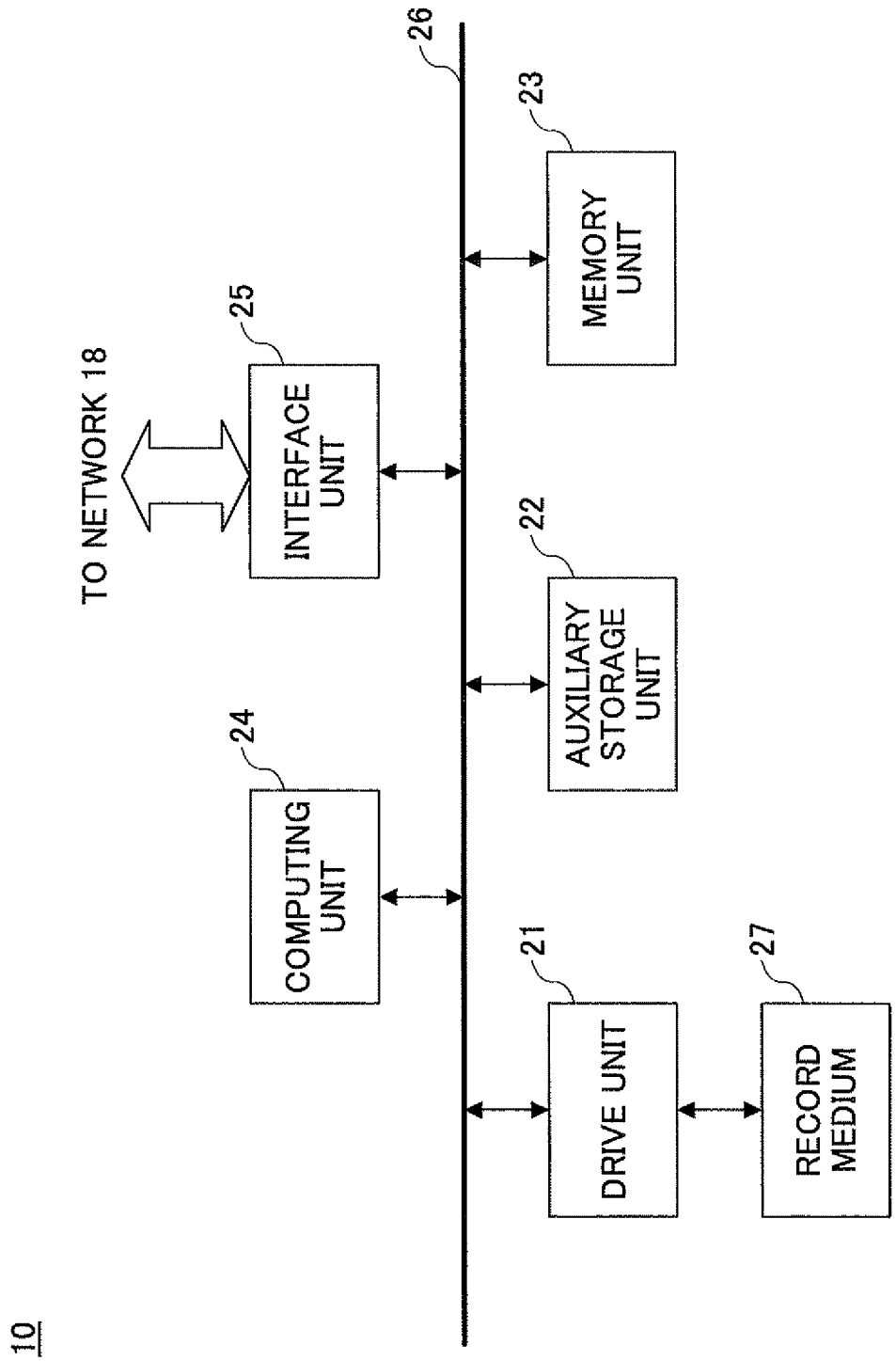
FIG. 2 is a drawing illustrating an example of the hardware configuration of a computer according to an embodiment of the present invention.

FIG. 2 is a drawing illustrating an example of the hardware configuration of the computer according to an embodiment of the present invention. The computer 10 illustrated in FIG. 2 includes a drive unit 21, an auxiliary storage unit 22, a memory unit 23, a computing unit 24, and an interface unit 25, which are connected together via a bus 26. Programs executed by the computer 10 are provided in a recording medium 27 such as a CD-ROM.

The drive unit 21 serves to read the recording medium 27. Upon setting the recording medium 27 containing programs to the drive unit 21, the programs are installed from the recording medium 27 to the auxiliary storage unit 22 through the drive unit 21. In the present embodiment, the programs stored in the recording medium 27 may include various types of device drivers such as printer drivers and PC-FAX drivers. For the sake of convenience of explanation, printer drivers will be used as examples of such programs in the following description.

The auxiliary storage unit 22 stores installed programs, and, also, stores various files and data. The memory unit 23 serves to store a program read from the auxiliary storage unit 22 upon a request to execute the program. The computing unit 24 serves to provide the functions of the computer 10 according to programs stored in the memory unit 23. The interface unit 25 serves to connect the computer 10 to the network 18 illustrated in FIG. 1.

Figure 3:
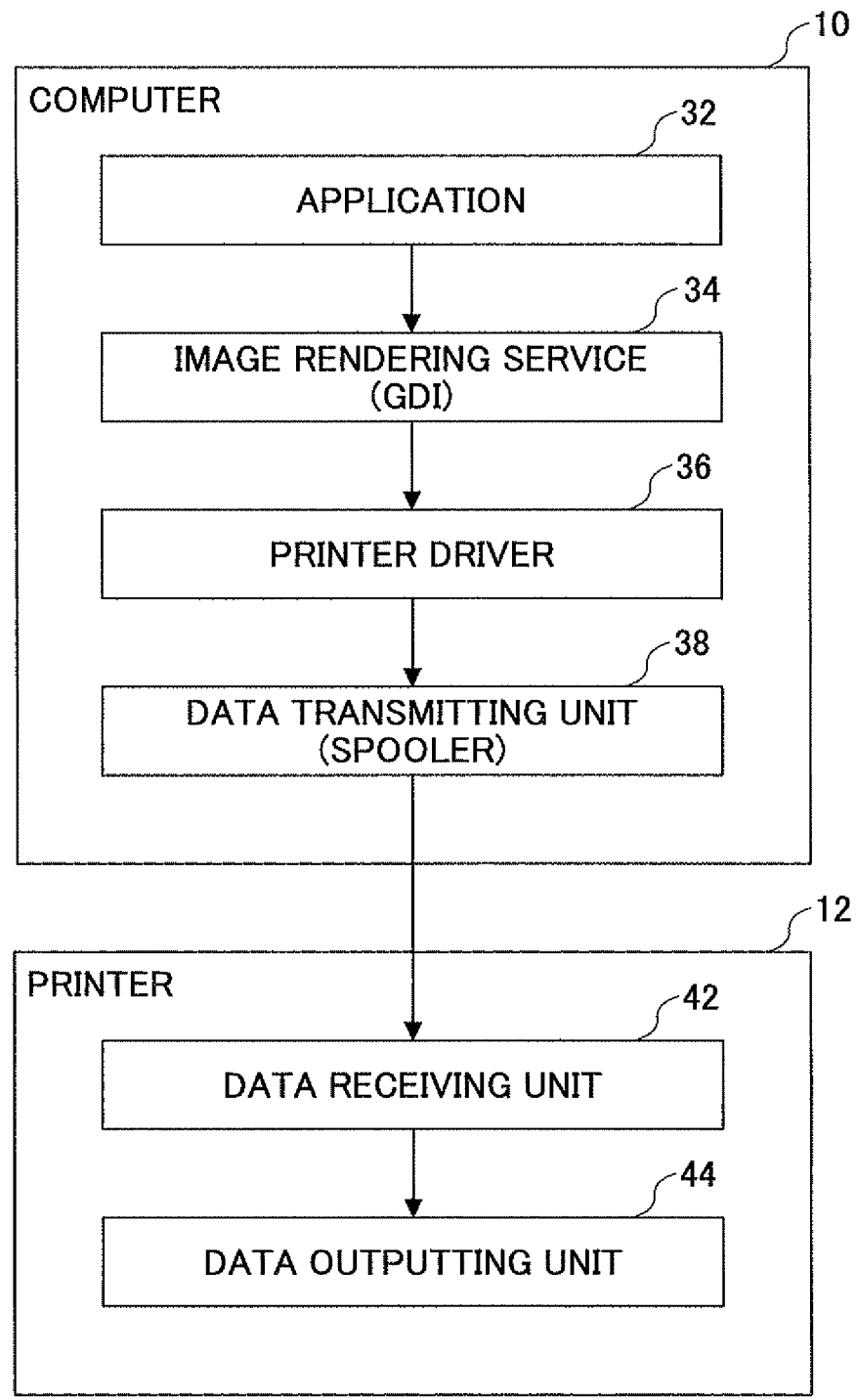
FIG. 3 is a drawing illustrating an example of the functional configuration of the computer according to an embodiment of the present invention.

FIG. 3 is a drawing illustrating an example of the functional configuration of the computer 10. The computer 10 illustrated in FIG. 3 is connected to the printer 12 via the network 18, and includes an application 32, an image rendering service 34, a printer driver 36, and a data transmitting unit 38.

The application 32 is a general-purpose application such as a word processor software or spread sheet software that runs on an OS such as a Windows OS (registered trademark).

The image rendering service 34 is an image rendering engine that runs on an OS. The image rendering service 34 is generally included in a GDI (Graphic Device Interface) together with an interface that connects between the application 32 and the image rendering service 34.

The printer driver 36 is a module that converts internal instructions in an OS into data processable by the printer 12, i.e., into data written in a page descriptive language (PDL). In general, a DDI (Device Driver Interface) connects between the GDI 34 and the printer driver 36.

The data transmitting unit 38 is a spooler module that spools PDL data generated by the printer driver 36. The PDL data spooled by the spooler 38 is transmitted from a print port to the printer 12 via the network 18.

The printer 12 is an apparatus having the function to print data created or viewed at the computer 10. The printer 12 includes a data receiving unit 42 for receiving PDL data transmitted from the data transmitting unit 38 of the computer 10 and a data outputting unit 44 for processing the received PDL data for outputting purposes.

In the following, specific embodiments will be described with reference to the accompanying drawings.

Embodiment

Figure 4:
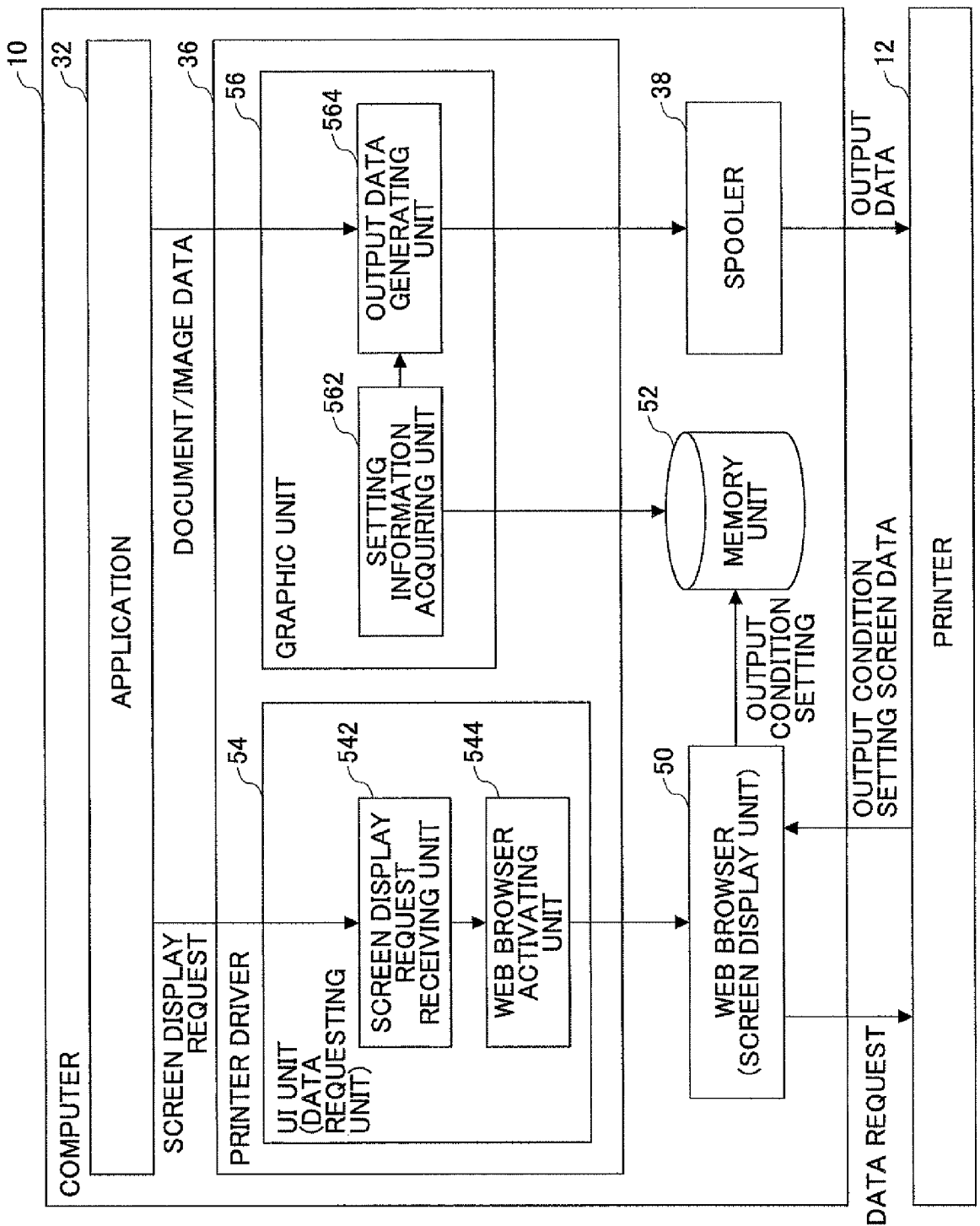
FIG. 4 is a block diagram illustrating a first example of the detailed configuration of the computer according to the embodiment.

FIG. 4 is a block diagram illustrating an example of the detailed configuration of the computer according to the present embodiment.

As illustrated in FIG. 4, the computer 10 includes a Web browser 50 and a memory unit 52 in addition to the application 32 and the printer driver 36.

Further, the computer 10 includes a user interface (UI) unit 54 and a graphics unit 56 in the printer driver 36. The UI unit 54 serves as a data requesting unit that requests the printer 12 to provide output condition setting screen data for displaying an output condition setting screen on which an output condition used in outputting output data at the printer 12 is to be set. To be specific, the UI unit 54 includes a screen display request receiving unit 542 for receiving a screen display request sent from the application 32 and a Web browser activating unit 544 for activating the Web browser 50 in response to the received screen display request. Via the Web browser 50, the UI unit 54 requests output condition setting screen data from the printer 12. The graphics unit 56 converts data such as document data created or viewed by the application 32 into data processable by the printer 12 in accordance with output condition setting information stored in the memory unit 52. The graphics unit 56 includes a setting information acquiring unit 562 and an output data generating unit 564. The setting information acquiring unit 562 retrieves the output condition setting information from the memory unit 52. The output data generating unit 564 converts data such as document data created or viewed by the application 32 into data processable by the printer 12 based on the retrieved output condition setting information. The data generated by the output data generating unit 564 is transmitted to the printer 12 via the spooler 38.

Figure 5:
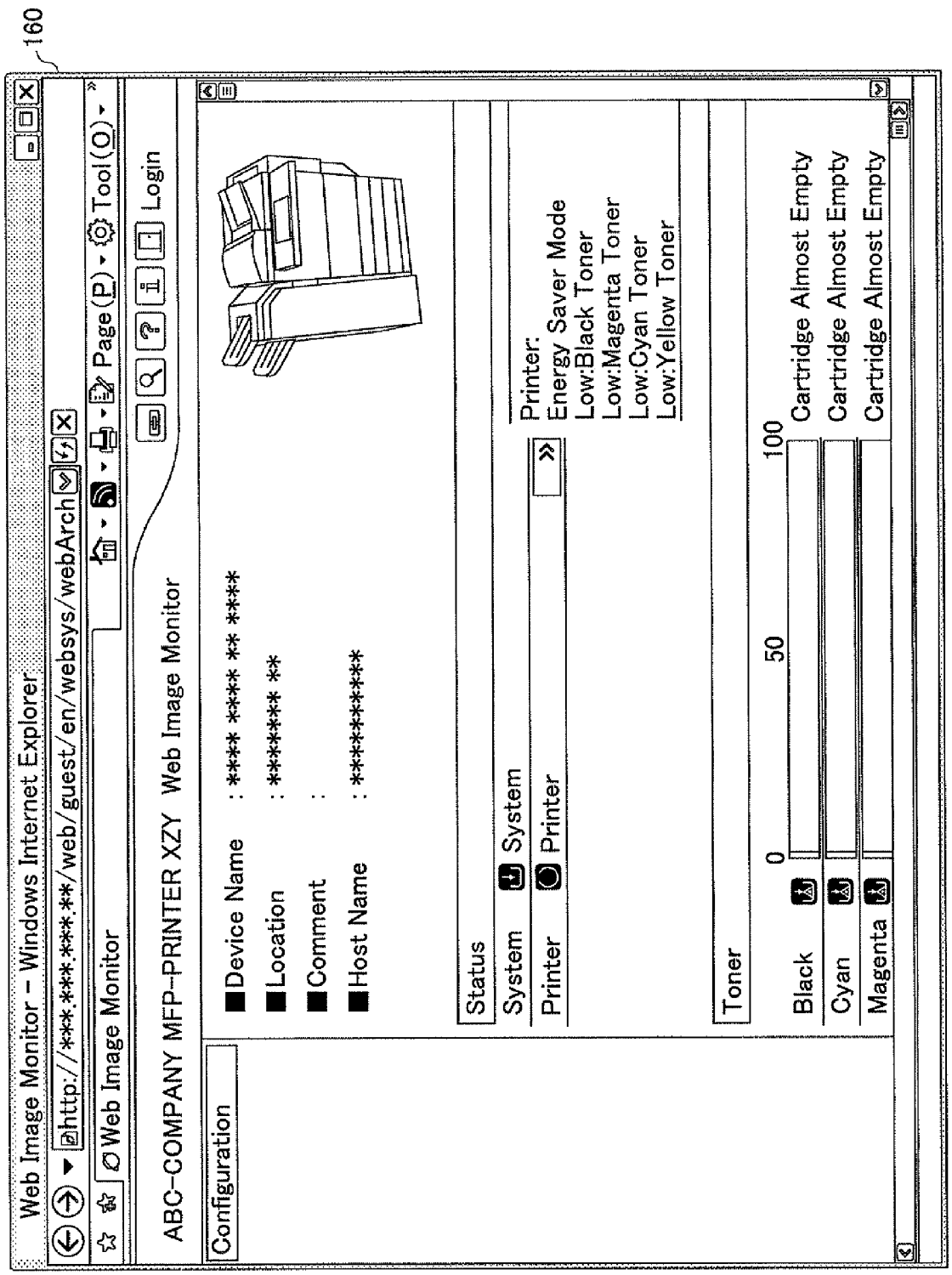
FIG. 5 is a drawing illustrating an example of an output condition setting screen.

The Web browser 50 may be used to access an external apparatus at a predetermined address on the network to acquire information (i.e., resources) for user-display purposes. The Web browser 50 may then display a Web page based on the acquired information. In the present embodiment, the Web browser 50 serves as a screen display unit that accesses the printer 12 to acquire output condition setting screen data for displaying an output condition setting screen, and displays the output condition setting screen as a Web page based on the acquired data. The Web browser 50 of the present embodiment may include software that generates information for user-display purposes based on a markup language such as an HTML or XML. The output condition setting screen may be a Web page that is displayed by such software. FIG. 5 is a drawing illustrating an example of an output condition setting screen displayed by the Web browser 50. A user may use an input apparatus such as a keyboard and mouse, for example, to make a setting to each item of the output conditions on the output condition setting screen (e.g., window). The output condition setting information set by the user is then stored in the memory unit 52.

Alternatively, the output condition setting information may be stored in a memory unit of the printer 12 or the shared server 16 connected via the network 18 to the computer 10 and other computers. In such a case, the memory unit 52 of the computer 10 stores identification information (hereinafter referred to as a setting information ID) for uniquely identifying output condition setting information stored in an external storage. The setting information ID is stored in the memory unit 52 simultaneously when the output condition setting information is stored in the external storage unit. The setting information acquiring unit 562 retrieves the setting information ID stored in the memory unit 52 to acquire the output condition setting information associated with the retrieved ID from the external storage unit.

Figure 6:
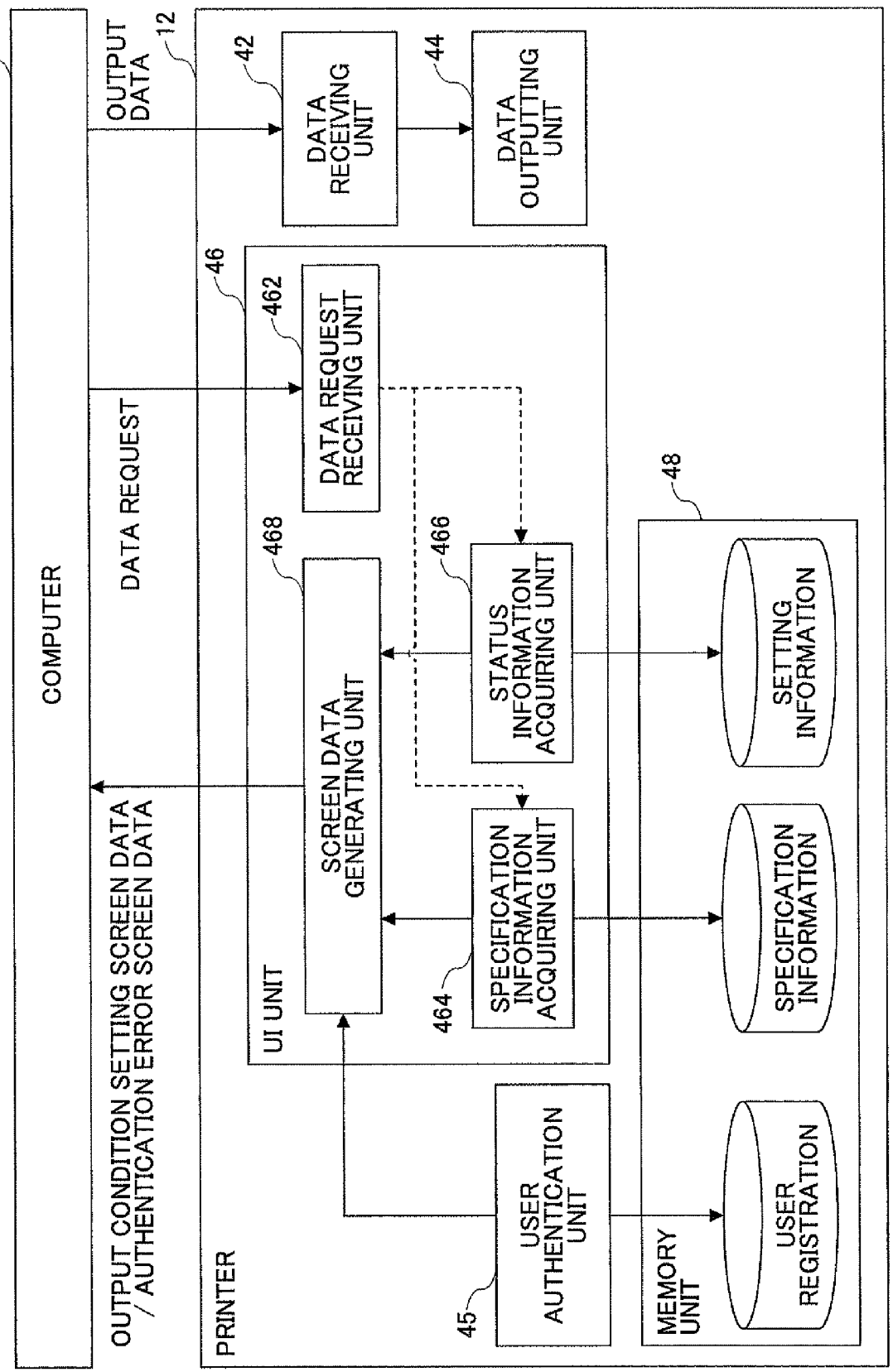
FIG. 6 is a block diagram illustrating an example of the detailed configuration of a printer according to the embodiment.

FIG. 6 is a block diagram illustrating an example of the detailed configuration of the printer according to the present embodiment.

As illustrated in FIG. 6, the printer 12 includes a user authentication unit 45, a UI unit 46, and a memory unit 48 in addition to the data receiving unit 42 and the data outputting unit 44 illustrated in FIG. 3. The user authentication unit 45 authenticates a user. The UI unit 46 generates output condition setting screen data in response to a request from the computer 10. The memory unit 48 stores specification information indicative of functions provided in the printer 12 and status information indicative of the current status of the printer 12.

The user authentication unit 45 identifies a user using the printer 12 by referring to user registration data that is stored in the memory unit 48 in advance. As a result of the authentication, the user authentication unit 45 may detect a user who is not authorized to use, or may detect a user who is authorized to use but is restricted as to which functions to use. When such a user is detected, the user authentication unit 45 notifies the UI unit 46 accordingly.

The UI unit 46 includes a data request receiving unit 462, a specification information acquiring unit 464, a status information acquiring unit 466, and a screen data generating unit 468. The data request receiving unit 462 receives a request for output condition setting screen data sent from the computer. In response to the received data request, the specification information acquiring unit 464 retrieves specification information from the memory unit 48, and the status information acquiring unit 466 retrieves status information from the memory unit 48. Based on the specification information and status information retrieved from the memory unit 48, the screen data generating unit 468 generates output condition setting screen data. Upon being notified of a result of the user authentication from the user authentication unit 45, the screen data generating unit 468 generates screen data that reflects the notified result.

The specification information includes information relating to the functions of the printer 12 such as color printing or monochrome printing, duplex printing, combined printing, paper size, stapling, Z folding, etc. The status information includes information regarding the current status of the printer 12 such as a remaining ink amount, a remaining toner amount, and the presence or absence of print sheets.

[Operations from Output Condition Setting to Data Outputting]

FIG. 7 is a drawing illustrating operations performed upon the issuance of a request to display an output condition setting screen at the computer to output data.

In step S101, the application 32 sends a request to display an output condition setting screen to the printer driver 36. This request is received by the UI unit 54 of the printer driver 36. Such a screen display request is issued when a user clicks a "property" button on the print setting screen that is displayed during the execution of the application software.

In step S102, the UI unit 54 activates the Web browser 50 in response to the received screen display request. In so doing, the UI unit 54 also informs the Web browser 50 of the IP address of the printer 12 that is selected in advance. Further, argument information "mode=driver_ui" may be added following the IP address to indicate a driver UI as an activation mode, so that the printer 12 will generate a Web screen suitable for a driver UI for transmission to the computer 10. Accordingly, URL information such as "http://*.*.*./main.cgi?mode=driver_ui" may be given from the UI unit 54 to the Web browser 50.

In step S103, the Web browser 50 sends a request for output condition setting screen data to the printer 12 at the IP address specified by the UI unit 54. Specifically, the Web browser 50 sends to the printer 12 the screen data request that is the URL information "http://*.*.*./main.cgi?mode=driver_ui" passed from the UI unit 54.

In step S104, the printer 12 responds to the request sent from the computer 10 via the Web browser 50 by reading specification information and status information from the memory unit 48, and generates output condition setting screen data based on the retrieved information. In step S105, the printer 12 transmits the generated output condition setting screen data to the Web browser 50 of the computer 10.

In step S106, the Web browser 50 displays an output condition setting screen as a Web page based on the output condition setting screen data sent from the printer 12. In step S107, a user uses an input apparatus such as a keyboard and mouse, for example, to make a setting to each necessary item of the output conditions on the output condition setting screen. In step S108, the output condition setting information set by the user is stored in the memory unit 52.

The output condition setting screen data may include an embedded script module such as a JavaScript or JavaApplet. With this arrangement, it is possible to store the output condition settings as a local file at the computer 10 serving as a Web client as these output condition settings are made on the output condition setting screen displayed as a Web page.

After the output condition settings are made as described above, the application 32 sends an output request to the printer driver 36 in step S109 to request the outputting of data such as document data created or viewed by the application 32. This request is received by the graphics unit 56 of the printer driver 36. Such an output request is issued when a user clicks an "OK" button on the print setting screen that is displayed during the execution of the application software.

In step S110, the graphics unit 56 retrieves the output condition setting information from the memory unit 52 in response to the received output request. In step S111, the graphics unit 56 generates data processable by the printer 12 by converting data such as document data created or viewed by the application 32 based on the retrieved output condition setting information. In step S112, the data generated is transmitted from the computer 10 to the printer 12 via the spooler 38.

In final step S113, the printer 12 processes and outputs (i.e., prints) the output data transmitted from the computer 10.

With the arrangement described above, the graphics unit 56 can generate output data based on the output condition settings made on a Web page.

Further, as previously described, the output condition setting information may be stored in an external storage unit such as the memory unit 48 of the printer 12 or the shared server 16 connected via the network 18 to the computer 10 and other computers, rather than being stored in the memory unit 52 of the computer 10. FIG. 8 is a drawing illustrating an example of the configuration of the computer 10 for use in such an arrangement. In the configuration illustrated in FIG. 8, the setting information acquiring unit 562 of the graphics unit 56 is provided with the function to communicate with an external storage apparatus 60. In the following, the operations of the computer 10 performed in the case of output condition setting information being stored in the external storage apparatus 60 will be described by referring to FIG. 9.

In step S201, the application 32 sends a request to display an output condition setting screen to the printer driver 36. In step S202, the UI unit 54 activates the Web browser 50 in response to the received screen display request. In so doing, the UI unit 54 also informs the Web browser 50 of the IP address of the printer 12 that is selected in advance, together with the argument information "mode=driver_ui" indicating a driver UI as an activation mode. In step S203, the Web browser 50 sends a request for output condition setting screen data to the printer 12 at the IP address specified by the UI unit 54.

In step S204, the printer 12 responds to the request sent from the computer 10 via the Web browser 50 by reading specification information and status information from the memory unit 48, and generates output condition setting screen data based on the retrieved information. In step S205, the printer 12 transmits the generated output condition setting screen data to the Web browser 50 of the computer 10.

In step S206, the Web browser 50 displays an output condition setting screen as a Web page based on the output condition setting screen data sent from the printer 12. In step S207, a user uses an input apparatus such as a keyboard and mouse, for example, to make a setting to each necessary item of the output conditions on the output condition setting screen. In step S208, the output condition setting information set by the user is stored in the external storage apparatus 60 such as the memory unit 48 of the printer 12 or the shared server 16 connected via the network 18 to the computer 10 and other computers. In step S209, further, setting information ID for uniquely identifying output condition setting information stored in an external storage is stored in the memory unit 52 of the computer 10.

As previously described, the output condition setting screen data includes an embedded script module such as a JavaScript or JavaApplet. With this arrangement, it is possible to store the setting information ID associated with the output condition setting information as a local file at the computer 10 serving as a Web client. Further, the output condition setting screen data includes an embedded communication application such as a Web-service client. With this arrangement, it is possible to store in the external storage apparatus 60 the output condition settings that are made on the output condition setting screen displayed as a Web page.

After the output condition settings are made as described above, the application 32 sends an output request to the printer driver 36 in step S210 to request the outputting of data such as document data created or viewed by the application 32.

In step S211, the graphics unit 56 retrieves the setting information ID from the memory unit 52 in response to the received output request. In step S212, the graphics unit 56 retrieves the output condition setting information associated with the retrieved setting information ID from the external storage apparatus 60. In step S213, the graphics unit 56 generates data processable by the printer 12 by converting data such as document data created or viewed by the application 32 based on the retrieved output condition setting information. In step S214, the data generated is transmitted from the computer 10 to the printer 12 via the spooler 38.

In final step S215, the printer 12 processes and outputs (i.e., prints) the output data transmitted from the computer 10.

With the arrangement described above, the graphics unit 56 can retrieve output condition setting information from the external storage apparatus 60 based on a setting information ID, and can generate output data based on the output condition settings made on a Web page.

FIG. 10 is a drawing illustrating an example of the data structure of output condition setting information.

Output condition setting information 70 illustrated in FIG. 10 uses UTF-8 character encoding in an XML format, for example. The output condition setting information 70 includes setting information ID data 72 and function setting information 74. The function setting information 74 includes setting information 74a, 74b, 74c, and so on for respective settings of the printer. For example, the setting information 74b relates to paper size, which is set equal to "A4" in this example.

The setting information ID data 72 includes computer identification information, an application name, a document name, a character string (e.g., time code) comprised of random alphanumeric characters, by which the output condition setting information 70 is uniquely identified. The setting information ID is assigned to the output condition setting information 70 when the user clicks the "OK" button on the output condition setting screen after making a setting to each necessary item of the output conditions on the output condition setting screen. When the data output request is thereafter sent from the application 32, the graphics unit 56 retrieves a setting information ID comprised of an application name, a document name, and a character string comprised of random alphanumeric characters from the memory unit 52 based on the application name of the application 32 and the name of the document being accessed by the application 32. It should be noted that the output conditions are generally set for each document. Accordingly, the output condition setting information 70 can be identified by use of a setting information ID including no character string comprised of random alphanumeric characters when the output condition setting information 70 is stored in the memory unit 52 of the computer 10. In such a case, there is no need to store a setting information ID separately as in the case in which the output condition setting information 70 is stored in the external storage apparatus 60.

Alternatively, a setting information ID may be reported to the Web browser 50 together with an IP address when the IP address of the printer 12 is given from the UI unit 54 to the Web browser 50. In such a case, the setting information ID is stored in the memory unit shared by the UI unit 54 and graphics unit 56 of the printer driver 36. The Web browser 50 sends a request for output condition setting screen data with a setting information ID to the printer 12. The printer 12 then returns the output condition setting screen data inclusive of the setting information ID to the Web browser 50. The Web browser 50 displays an output condition setting screen based on the received data. After the user makes a setting to each item of the output conditions, the Web browser 50 stores the output condition setting information in the memory unit 52 of the computer 10 or in the external storage apparatus 60. The stored information of course contains the setting information ID. The graphics unit 56 retrieves the setting information ID from the memory unit shared with the UI unit 54, and further retrieves the output condition setting information corresponding to the retrieved ID from the memory unit 52 of the computer 10 or from the external storage apparatus 60.

As described above, output condition setting information can be uniquely identified by use of setting information ID. With this arrangement, even when output data is generated at different timing than the timing at which output condition settings are made, proper output condition setting information can be retrieved to generate proper output data.

Figure 11:
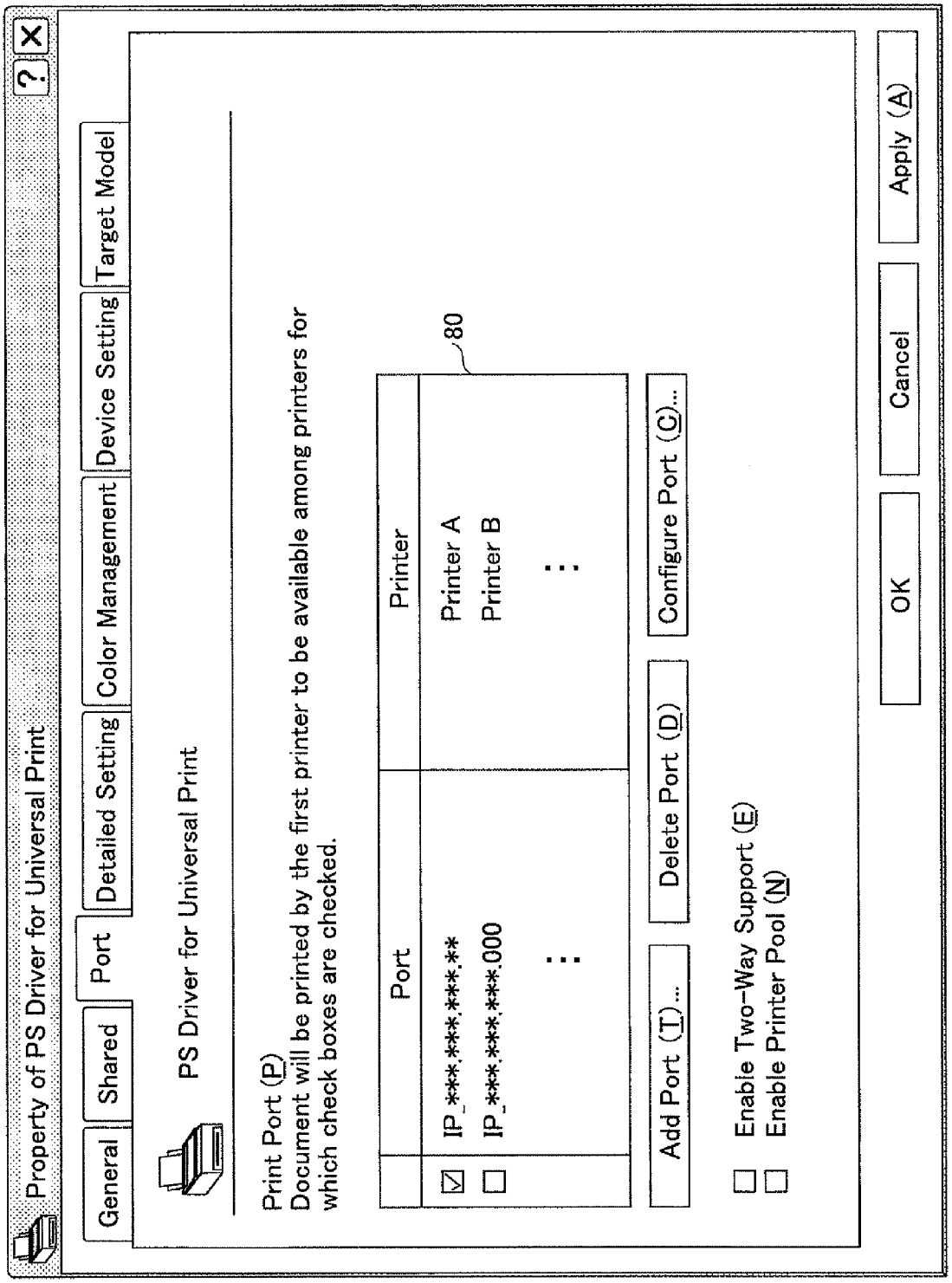
FIG. 11 is a drawing illustrating an example of a port selecting screen on which a data outputting printer is selected.

FIG. 11 is a drawing illustrating an example of a port selecting screen on which a data outputting printer is selected. As previously described, when the application 32 sends a screen display request to the printer driver 36, the UI unit 54 of the printer driver 36 responds to the screen display request by informing the Web browser 50 of the IP address of the printer 12 that is selected in advance. The screen illustrated in FIG. 11 is an example of a screen that is used to select a particular printer as a default printer in advance from a plurality of printers connected to the computer 10.

As illustrated in a selection box 80 of the screen (e.g., window) of FIG. 11, each printer has a uniquely assigned IP address. When a printer is selected in the selection box 80, the IP address assigned to this selected printer will subsequently be used at the time of displaying an output condition setting screen. The computer 10 will be able to access the selected printer by use of this IP address.

As is apparent from the above description, the computer 10 of the present embodiment acquires output condition setting screen data from the printer 12, so that there is no need to have device information regarding the printer 12 in advance. Further, provision is made such that the printer driver 36 can retrieve from the memory unit 52 or 60 the output condition settings that are made on an output condition setting screen displayed as a Web page. Output data can thus be generated based on the output condition settings that are set on the Web page. With such provision, moreover, the computer 10 can flexibly cope with functional extensions made to the printer 12.

[Operation Performed Upon Inquiry from Application about Device Specification]

Figure 12:
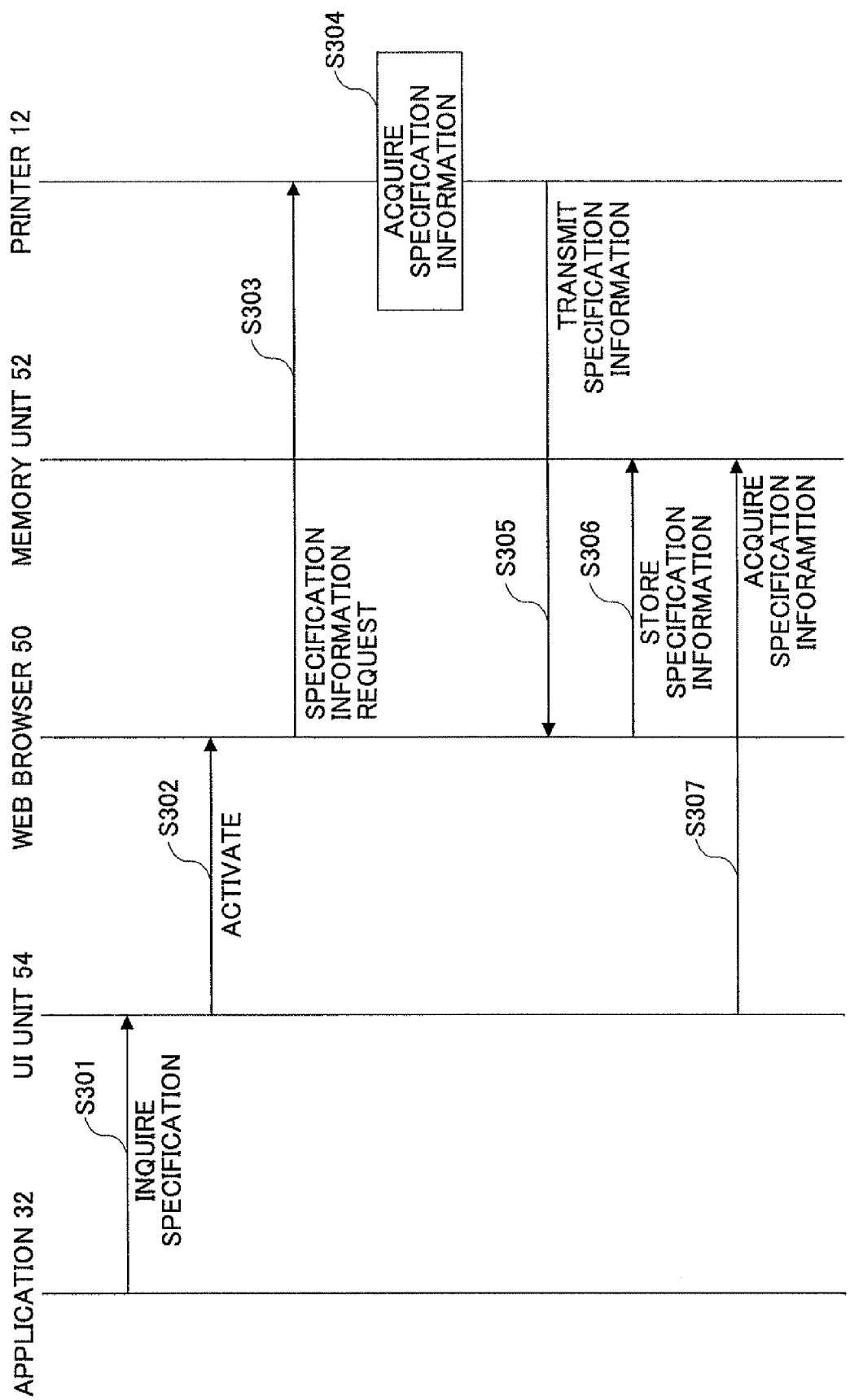
FIG. 12 is a sequence chart illustrating an example of the operation performed by the computer to inquire about device specifications according to the embodiment.

In the following, operations performed upon an inquiry about the specifications of the printer 12 sent from the application 32 to the printer driver 36 will be described by referring to FIG. 12. Basically, such operations are the same as those performed when displaying an output condition setting screen.

In step S301, the application 32 sends an inquiry about the specifications of the printer 12 to the printer driver 36. Here, the specifications of the printer 12 refer to information regarding the functions provided in the printer 12. This inquiry is received by the UI unit 54 of the printer driver 36. When a particular printer is selected on a control panel, for example, such an inquiry may be generated.

In step S302, the UI unit 54 activates the Web browser 50 in response to the received specification inquiry. In so doing, the UI unit 54 also informs the Web browser 50 of the IP address of the printer 12 that is selected in advance, together with the argument information indicating a driver UI as an activation mode.

In step S303, the Web browser 50 sends a request for specification information acquisition to the printer 12 at the IP address specified by the UI unit 54.

In step S304, the printer 12 responds to the request sent from the computer 10 via the Web browser 50 by reading specification information from the memory unit 48 by use of the specification information acquiring unit 464. In step S305, the printer 12 transmits the retrieved specification information to the Web browser 50 of the computer 10.

In step S306, the Web browser 50 stores the specification information supplied from the printer 12 in the memory unit

52. The specification information includes an embedded script module such as a JavaScript or JavaApplet. With this arrangement, it is possible to store the specification information as a local file at the computer 10 serving as a Web client.

In final step S307, the UI unit 54 retrieves the specification information from the memory unit 52 to know the specifications of the printer 12, thereby being able to respond to the inquiry from the application 32.

[Error Display Operation]

In the computer 10 of the present embodiment that has been described heretofore, the printer driver 36 does not display a model-specific UI, and does not cope with model-specific functions. As a general principle, every task of such kind is delegated to the printer. Depending on the type of processing, however, some tasks may better be performed as a task embedded in the graphics unit 56 of the printer driver 36.

For example, the graphics unit 56 may have processes a, b, c, and d embedded therein in one-to-one correspondence to functions A, B, C, and D. Further, output condition setting information obtained through an output condition setting screen displayed by the Web browser 50 may specify functions A, B, C, D, E, F, and G, and the functions E and F may include corresponding processes e and f. In such a case, the process corresponding to the function G is not known to the graphics unit 56. In response, the printer driver 36 can display an error screen by use of the UI unit 54. Alternatively, the computer 10 of the present embodiment may be configured such that the UI unit 54 uses the Web browser 50 to notify the printer 12 of the occurrence of the error, and, then, a proper error screen is displayed based on error screen data sent from the printer 12. For example, URL information such as "http:// *.*.*./ main.cgi?mode=error_ui&reason=lackness_functionG" may be sent as an error screen data request from the UI unit 54 to the printer 12 via the Web browser 50.

Figure 13:
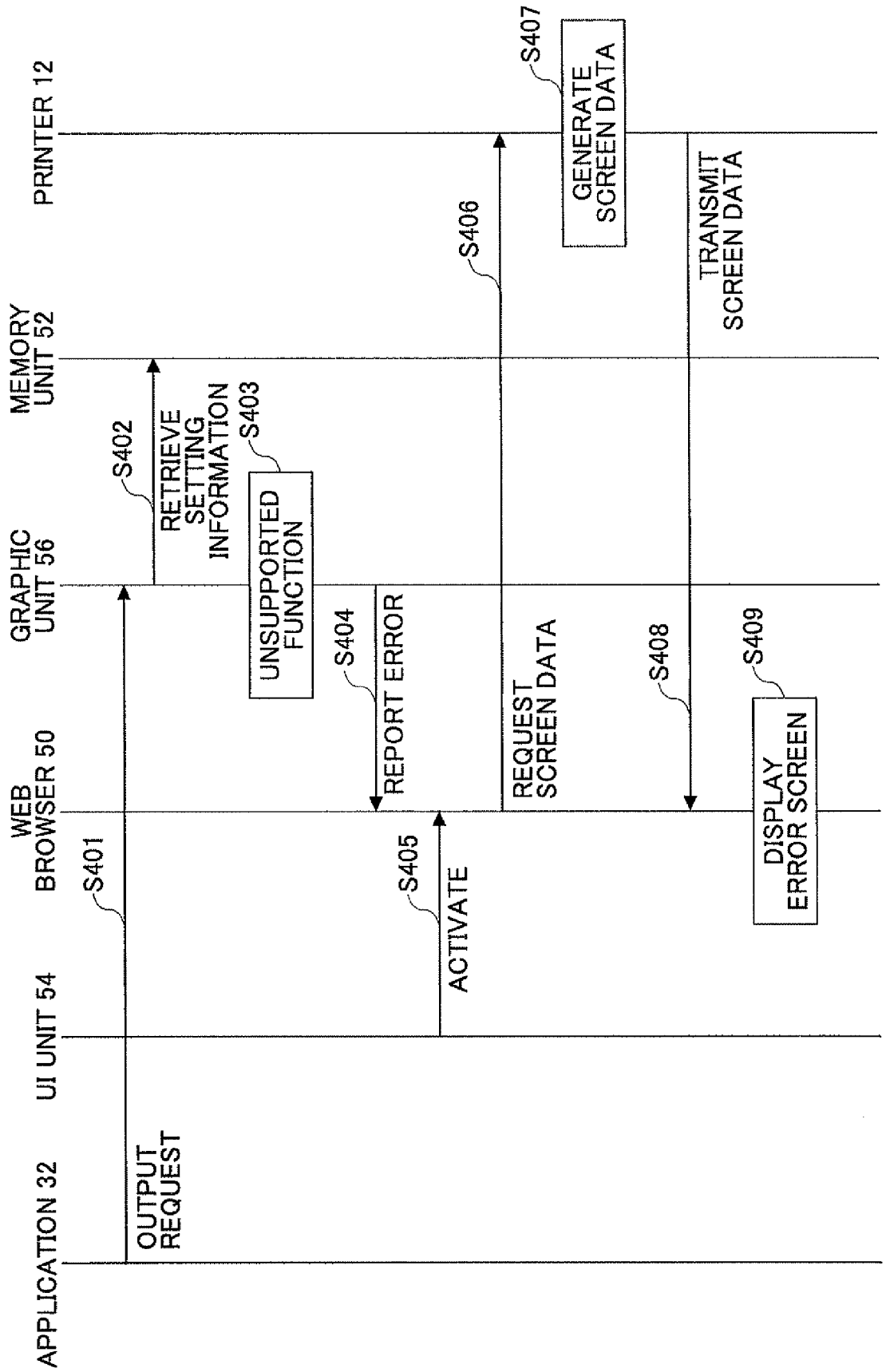
FIG. 13 is a sequence chart illustrating an example of an error display operation performed by the computer according to the embodiment.

Such an operation to display an error screen will be described in detail by referring to FIG. 13.

In the state in which output condition settings are already made, the application 32 sends an output request to the printer driver 36 in step S401 to request the outputting of data such as document data created or viewed by the application 32. This request is received by the graphics unit 56 of the printer driver 36. As previously described, such an output request is issued when a user clicks an "OK" button on the print setting screen that is displayed during the execution of the application software.

In step S402, the graphics unit 56 retrieves the output condition setting information from the memory unit 52 in response to the received output request. In general, the graphics unit 56 generates data processable by the printer 12 by converting data such as document data created or viewed by the application 32 based on the retrieved output condition setting information. When the output condition setting information contains information regarding a function that is not supported by the graphics unit 56, however, the graphics unit 56 ascertains in step S403 that the output condition setting information contains unknown function information. In step S404, the graphics unit 56 notifies the UI unit 54 of the presence of unknown function information.

Provision may be made such that the UI unit 54 displays an error screen on its own. In this example, however, alternative provision is made such that the Web browser 50 requests the printer 12 to create error screen data. To this end, the UI unit 54 activates the Web browser 50 in step S405 in response to the error notice from the graphics unit 56. In so doing, the UI unit 54 sends to the Web browser 50 the IP address of the printer 12 together with argument information "mode=error_ui" indicating an error UI as an activation mode and argument information "reason=lackness_functionG" (indicating the presence of unsupported function G) indicating the cause of the error, thereby arranging for the printer 12 to create and return to the computer 10 a Web screen suitable as an error UI.

In step S406, the Web browser 50 sends a request for error screen data to the printer 12 at the IP address specified by the UI unit 54. Specifically, the Web browser 50 sends to the printer 12 the screen data request that is the URL information "http://*.*.*./ main.cgi?mode=error_ui&reason=lackness_functionG" passed from the UI unit 54.

In step S407, the printer 12 responds to the request sent from the computer 10 via the Web browser 50 by creating error screen data. In step S408, the printer 12 transmits the generated error screen data to the Web browser 50 of the computer 10.

In step S409, the Web browser 50 displays an error screen as a Web page based on the error screen data sent from the printer 12.

[Operation to Specify PDL]

As previously described, the printer driver 36 can generally convert internal instructions in an OS into data processable by the printer 12, i.e., into data written in a page descriptive language (PDL). There are many PDLs that are independently developed by different printer manufacturers. Well-known examples of such PDLs include a PCL (Printer Control Language) and PostScript (registered trademark). Output condition setting information differs in its contents depending on the types of PDLs used by the printer driver 36.

In the computer 10 of the present embodiment, the UI unit 54 may specify various types of parameters in the CGI arguments of URL information that is sent at the time of activating the Web browser 50. With such parameters, the printer 12 can determine an activation mode to dynamically change script modules such as a JavaApplet embedded in the screen data that is transmitted in response. Accordingly, it is preferable to specify the type of the PDL used by the printer driver 36 in the CGI arguments of the URL information that is sent from the UI unit 54 at the time of activating the Web browser 50. This makes it possible to notify the printer 12 of a driver UI conforming to the PCL or PostScript (registered trademark) as an activation mode, for example. In response, the types of PDLs can be switched between PCL and PostScript with respect to the screen data and script module embedded therein that are to be returned from the printer 12 to the computer 10.

The URL information sent from the UI unit 54 to the Web browser 50 may be "http://*.*.*./ main.cgi?mode=driver_ui&pdl=pcl" in the case of the printer driver 36 conforming to PCL, and may be "http:// *.*.*./main.cgi?mode=driver_ui&pdl=postscript" in the case of the printer driver 36 conforming to PostScript (registered trademark).

[User Authentication Operation]

The computer 10 of the present embodiment may use the user authentication function of the printer 12 to authenticate a user who is attempting to use the printer 12. Such user authentication becomes possible by sending user information "user=XYZ" (indicating a user identified as "XYZ", which may be a user name or uniquely assigned identifier) together with the IP address of the printer 12 from the UI unit 54 to the Web browser 50 in order to display an output condition setting screen. In such a case, URL information such as "http:// *.*.*./main.cgi?mode=driver_ui&user=XYZ" may be sent as a screen data request to the printer 12 via the Web browser 50.

The printer 12 generates output condition setting screen data in response to a screen data request. If user information is attached to the request, the user authentication unit 45 performs user authentication with respect to the specified user. Such user authentication may detect a user who is not authorized to use, or may detect a user who is authorized to use but is restricted as to which functions to use. When such a user is detected, the user authentication unit 45 notifies the UI unit 46 of such detection. The screen data generating unit 468 then generates screen data that reflects the results of authentication. If a user who does not have authorization to use is detected, for example, the screen data generating unit 468 generates authentication error screen data for causing the computer 10 to display an authentication error screen instead of an output condition setting screen. If a user who has authorization to use but is restricted as to what functions the user can use is detected, the screen data generating unit 468 generates output condition setting screen data in which user-settable items are limited.

In order to perform such authentication, the printer 12 needs to be provided with user registration data that is stored prior to the actual use of the system. The descriptions have been given heretofore based on a premise that the user registration data is stored in advance in the memory unit 48 of the printer 12. Alternatively, the UI unit 54 of the computer 10 may transmit the user registration data to the printer 12 prior to activating the Web browser 50 upon receiving a screen display request from the application 32. In such a case, the user registration data needs to be stored in the computer 10 in advance. The printer 12 can use the user registration data sent from the computer 10 to perform user authentication by use of the user authentication unit 45.

FIG. 14 is a drawing illustrating an example of the data structure of user registration data.

User registration data 80 illustrated in FIG. 14 uses UTF-8 character encoding in an XML format, for example. The user registration data 80 includes user information 82 and function restriction information 84. The user information 82 identifies a user who is authorized to use the printer 12. The function restriction information 84 includes restriction setting information 84a and 84b regarding the functions the use of which is restricted for the user identified by the user information 82. The restriction setting information 84a relates to "paper size", for example, indicating that the use of "A5" size sheets and "A6" size sheets is not allowed.

[Operation to Use Default Value]

The computer 10 of the present embodiment may employ its own default information, so that the default settings of an output condition setting screen set by the vendor at the time of shipment can be changed as desired. The default information noted above is used to change the default settings set by the vendor at the time of shipment to predetermined default values that take into account the actual usage of particular functions of the printer. For example, the printer 12 may be a printer that can print color images. In a business environment involving office work, however, it may be desirable to use "monochrome" printing as a default setting from a viewpoint of cost reduction. In such a case, the default information includes data for setting "monochrome" printing as a default setting.

FIG. 15 is a drawing illustrating an example of the data structure of default information. Default information 90 illustrated in FIG. 15 includes user information 92 and default value change information 94. The user information 92 identifies a user who is authorized to use the printer 12. The default value change information 94 includes change information 94a, 94b, and 94c indicative of function-specific changes to be made from the default values set by the vendor at the time of shipment. For example, the change information 94a relates to "print color", indicating "monochrome" as a default setting value.

The default information may be stored in advance in the memory unit 48 of the printer 12 prior to the actual use of the printer 12 in the same manner as the user registration data previously described. Alternatively, the default information may be transmitted from the UI unit 54 to the printer 12 prior to the activation of the Web browser 50 upon a screen display request sent from the application 32 to the UI unit 54 in the computer 10.

Based on the default information, the printer 12 generates output condition setting screen data in which default settings are changed with respect to the functions specified by the specification information.

In reality, such default change operation may be needed only when output condition settings are made for the first time. After this initial setting, values set by a user on an output condition setting screen will be displayed instead of the default values that are set according to the default information. In consideration of this, it is preferable to include information indicative of the number of previous screen data requests in a screen data request that is sent from the computer 10 to the printer 12 via the Web browser 50. Based on this information, the printer 12 can determine whether default changes should be made.

The default change operation described above may be performed in conjunction with the user authentication operation previously described.

[Variation]

The embodiments of the present invention have been described by using a printer driver as an example. This is not a limiting example. The present invention is applicable to other device drivers such as a scanner driver and a PC-FAX driver as long as these device drivers are software that converts instructions of application software into data processable by a device. Further, the type of software to which the present invention is applied is not limited to a device driver form or to a module form, but may also be application software itself.

In the following, various advantages of the disclosed embodiments will be noted. Acquiring screen data from an outputting apparatus makes it possible to generate data processable by the apparatus regardless of the type of the apparatus and the types of extended functions without needing apparatus information in advance. Even when output data is generated at different timing than the timing at which output condition settings are made, proper output condition setting information can be retrieved to generate proper output data. The utilization of a Web-based technology that has only a limited degree of OS dependency makes it possible to make output condition settings irrespective of the type of the OS platform embedded in the information processing apparatus. The use of a Web-service client and/or JavaScript or JavaApplet makes it possible to store output condition setting information as a local file in the information processing apparatus or in an external storage apparatus when the output condition setting information is set on an output condition setting screen. Even if the information processing apparatus is not provided with display-purpose data for use in displaying an error screen, screen data is acquired from the outputting apparatus to display an error screen to inform a user of the occurrence of an error. Attaching user information to the data request makes it possible to perform user authentication at the time of displaying an output condition setting screen. Further, attaching information indicative of the format type of output data to the data request makes it possible to display an output condition setting screen conforming to the format used by the information processing apparatus. Transmission of user registration data to the outputting apparatus in advance makes it possible for the outputting apparatus to centrally manage usage restrictions regarding the outputting apparatus for each user. Further, transmission of default information to the outputting apparatus in advance makes it possible to display an output condition setting screen in which proper default values are used by taking into account actual usage.

The descriptions of exemplary embodiments for implementing the invention have been provided heretofore. The present invention is not limited to these embodiments, but various variations and modifications may be made without departing from the scope of the present invention.

The present application is based on Japanese priority application No. 2008-154538 filed on Jun. 12, 2008, with the Japanese Patent Office, the entire contents of which are hereby incorporated by reference.

What is claimed is:

1. An information processing apparatus for generating output data processable by a data outputting apparatus coupled thereto, comprising:
 a data requesting unit configured to send a data request to the data outputting apparatus to request the data outputting apparatus to provide output condition setting screen data for displaying an output condition setting screen on which an output condition used in outputting the output data at the data outputting apparatus is to be set;
 a screen display unit configured to receive the output condition setting screen data sent from the data outputting apparatus responding to the data request from the data requesting unit and to display the output condition setting screen based on the output condition setting screen data;
 a setting information storing unit configured to store, in a storage apparatus, output condition setting information that is set on the output condition setting screen displayed by the screen display unit; and
 an output data generating unit configured to generate output data processable by the data outputting apparatus in response to the output condition setting information stored in the storage apparatus,
 wherein the data requesting unit is further configured to specify a type of page description language corresponding to a driver of the data outputting apparatus in CGI arguments of URL information that is sent from the data requesting unit when a Web browser is activated, thereby notifying the data outputting apparatus of a driver user interface conforming to PCL or PostScript as an activation mode.

2. The information processing apparatus as claimed in claim 1, wherein the output condition setting information is uniquely identified by identification information.

3. The information processing apparatus as claimed in claim 2, wherein the identification information includes a name of an application being used in the information processing apparatus and a name of a document being opened by the application, and wherein the identification information further includes information for identifying the information processing apparatus and a predetermined character string in an event that the storage apparatus is external to the information processing apparatus.

4. The information processing apparatus as claimed in claim 1, wherein the screen display unit is configured to acquire the output condition setting screen data from the data outputting apparatus based on an IP address assigned to the data outputting apparatus.

5. The information processing apparatus as claimed in claim 4, wherein the output condition setting screen data has at least one of a Web-service client and JavaScript or JavaApplet embedded therein.

6. The information processing apparatus as claimed in claim 1, wherein when the output condition setting information includes information about a function that is not supported by the output data generating unit,
 the data requesting unit requests the data outputting apparatus to provide error screen data for displaying an error screen indicative of an inability to perform said function, and
 the screen display unit receives the error screen data sent from the data outputting apparatus responding to the error screen data request from the data requesting unit thereby to display the error screen based on the error screen data.

7. The information processing apparatus as claimed in claim 1, wherein the data requesting unit is configured to attach, to the data request to be sent to the data outputting apparatus, at least one of user information and information indicative of a format of output data generated by the output data generating unit.

8. The information processing apparatus as claimed in claim 1, wherein the data requesting unit is configured to send at least one of user registration data and default information to the data outputting apparatus prior to sending the data request to the data outputting apparatus, the user registration data specifying user-specific authorization and restriction with respect to use of the data outputting apparatus, and the default information specifying changes to be made to vendor-provided default values of the data outputting apparatus.

9. A data outputting system, comprising:
 the information processing apparatus of claim 1; and
 the data outputting apparatus coupled to the information processing apparatus,
 wherein the data outputting apparatus includes:
 a data receiving unit configured to receive output data generated by the information processing apparatus;
 a data outputting unit configured to output the output data received by the data receiving unit;
 an information storage unit configured to store specification information indicative of functions performable by the data outputting apparatus and status information indicative of a current status of the data outputting apparatus; and
 a screen data generating unit configured to respond to the data request sent from the information processing apparatus by generating, based on the specification information and status information stored in the information storage unit, the output condition setting screen data for displaying an output condition setting screen on which an output condition used in outputting the output data at the data outputting apparatus is to be set.

10. A non-transitory machine-readable recording medium having a program embodied therein for causing a computer to function as an information processing apparatus for generating output data processable by a data outputting apparatus coupled thereto, said program causing the computer to perform:
 sending, by a data requesting unit provided to the information processing apparatus, a data request to the data outputting apparatus to request the data outputting apparatus to provide output condition setting screen data for displaying an output condition setting screen on which an output condition used in outputting the output data at the data outputting apparatus is to be set;

receiving the output condition setting screen data sent from the data outputting apparatus responding to the data request thereby to display the output condition setting screen based on the output condition setting screen data; and generating output data processable by the data outputting apparatus in response to output condition setting information that is set on the displayed output condition setting screen, wherein said program causes the computer to further perform specifying a type of page description language corresponding to a driver of the data outputting apparatus in CGI arguments of URL information that is sent from the data requesting unit when a Web browser is activated, thereby notifying the data outputting apparatus of a driver user interface conforming to PCL or PostScript as an activation mode.

11. The non-transitory machine-readable recording medium as claimed in claim 10, wherein the output condition setting information is uniquely identified by identification information.

12. The non-transitory machine-readable recording medium as claimed in claim 11, wherein the identification information includes a name of an application being used in the information processing apparatus and a name of a document being opened by the application, and wherein the identification information further includes information for identifying the information processing apparatus and a predetermined character string in an event that a storage apparatus for storing the output condition setting information is external to the information processing apparatus.

13. The non-transitory machine-readable recording medium as claimed in claim 10, wherein the output condition setting screen data is acquired from the data outputting apparatus based on an IP address assigned to the data outputting apparatus.

14. The non-transitory machine-readable recording medium as claimed in claim 13, wherein the output condition setting screen data has at least one of a Web-service client and JavaScript or JavaApplet embedded therein.

15. The non-transitory machine-readable recording medium as claimed in claim 10, wherein said program causes the computer to perform further steps when the step of generating output data cannot generate output data because the output condition setting information includes information about a function that is not supported by the information processing apparatus, said further steps including:

requesting the data outputting apparatus to provide error screen data for displaying an error screen indicative of inability to perform said function, and receiving the error screen data sent from the data outputting apparatus responding to the error screen data request thereby to display the error screen based on the error screen data.

16. The non-transitory machine-readable recording medium as claimed in claim 10, wherein at least one of user information and information indicative of a format of output data generated by the output data generating unit is attached to the data request for requesting the output condition setting screen data.

17. The non-transitory machine-readable recording medium as claimed in claim 10, wherein said program causes the computer to perform sending at least one of user registration data and default information to the data outputting apparatus prior to sending the data request to the data outputting apparatus, the user registration data specifies user-specific authorization and restriction with respect to use of the data outputting apparatus, and the default information specifies changes to be made to vendor-provided default values of the data outputting apparatus.

* * * * *